(12) United States Patent
Nas et al.

(10) Patent No.: US 8,811,453 B2
(45) Date of Patent: Aug. 19, 2014

(54) DYNAMIC POWER SCALING OF AN INTERMEDIATE SYMBOL BUFFER ASSOCIATED WITH COVARIANCE COMPUTATIONS

(75) Inventors: Ricky Nas, Eindhoven (NL); Cornelis Van Berkel, Heeze (NL); Jean-Paul Smeets, Eindhoven (NL)

(73) Assignee: Ericsson Modems SA, Plan-les-Ouates ( * ) Notice: Subject to any disclaimer, the term of this patent is extended or adjusted under 35 U.S.C. 154(b) by 375 days.

(21) Appl. No.: 13/239,586

(22) Filed: Sep. 22, 2011

(65) Prior Publication Data
US 2013/0080711 A1    Mar. 28, 2013

(51) Int. Cl.
H04B 1/69     (2011.01)
H04B 1/707    (2011.01)
H04B 1/713    (2011.01)
H04B 1/7115   (2011.01)
H04B 1/7093   (2011.01)

(52) U.S. Cl.
CPC .... H04B 1/7115 (2013.01); H04B 2001/70935 (2013.01); H04B 2201/709727 (2013.01)
USPC ........... 375/148; 375/150; 375/152; 375/144; 375/142; 375/343; 370/335; 370/342; 370/320; 370/441; 370/479

(58) Field of Classification Search
CPC .... H04B 1/7115; H04B 1/7117; H04B 1/712; H04B 1/707; H04B 1/7107; H04B 1/7093; H04B 1/709; H04B 7/2628; H04B 2201/70701; H04B 1/7075; H04L 7/042; H04L 27/2662; H04J 13/00
USPC ......... 375/148, 150, 152, 144, 142, 143, 347, 375/343; 370/335, 342, 320, 441, 479
See application file for complete search history.

(56) References Cited

U.S. PATENT DOCUMENTS 5,305,349 A  *  4/1994  Dent ............................. 370/209
5,831,977 A  *  11/1998  Dent ............................. 370/335

(Continued)

FOREIGN PATENT DOCUMENTS

EP         1172957 A1       1/2002

OTHER PUBLICATIONS

The University of Edinburgh; Mark P. Tennant; Lower Power Adaptive Equaliser Architectures for Wireless LMMSE Receivers; Oct. 2007; 165 pages.

(Continued)

*Primary Examiner* — Phoung Phu
(74) *Attorney, Agent, or Firm* — Howison & Arnott, LLP

(57) ABSTRACT

An intermediate symbol buffer (ISB) configuration and method is provided such that the ISB memory comprises 15 portions, one for each HSDPA spreading code. Symbols associated with a spreading code are written to the memory portion associated with the same spreading code. When a covariance calculation is performed to obtain a more accurate channel estimate, only the symbols associated with spreading codes determined to be needed for the covariance calculation are written to the ISB by a buffer block and red from the ISB by a correlation core. The symbols associated with spreading codes that are not necessary for a covariance calculation may be masked from being written or read from the ISB. In some embodiments each memory portion is an individual memory block. In other embodiments a plurality of memory blocks may contain a plurality of memory portions, one memory partition designated, at least temporarily, for each spreading code.

16 Claims, 5 Drawing Sheets

(56) References Cited

U.S. PATENT DOCUMENTS

| | | |
|---|---|---|
| 6,108,565 A | 8/2000 | Scherzer |
| 6,163,563 A * | 12/2000 | Baker et al. .................... 375/130 |
| 6,249,251 B1 * | 6/2001 | Chang et al. .................. 342/378 |
| 6,748,014 B1 | 6/2004 | Kuo et al. |
| 6,985,468 B2 * | 1/2006 | Arimura ....................... 370/335 |
| 7,752,410 B1 | 7/2010 | Shin et al. |
| 2002/0150149 A1 | 10/2002 | Tanno |
| 2005/0013350 A1 * | 1/2005 | Coralli et al. ................. 375/148 |
| 2005/0111528 A1 * | 5/2005 | Fulghum et al. .............. 375/148 |
| 2005/0180496 A1 * | 8/2005 | Olson et al. ................... 375/148 |
| 2005/0195926 A1 | 9/2005 | Ruprich et al. |
| 2006/0013328 A1 * | 1/2006 | Zhang et al. .................. 375/267 |
| 2006/0215615 A1 | 9/2006 | Maeda |
| 2006/0251155 A1 * | 11/2006 | Zhou ............................ 375/148 |
| 2006/0251156 A1 | 11/2006 | Grant et al. |
| 2008/0304554 A1 * | 12/2008 | Fulghum et al. .............. 375/149 |
| 2011/0235728 A1 * | 9/2011 | Karabinis ..................... 375/260 |

OTHER PUBLICATIONS

Stefan Eberli; Application-Specific Processor for MIMO-OFDM Software-Defined Radio; 2009; 237 pages.

Peter Strobach; Efficient Covariance Ladder Algorithms for Finite Arithmetic Applications; Siemens AG, Information Systems Laboratory, Germany; received Mar. 6, 2986, revised Oct. 14, 1986; pp 29-70.

* cited by examiner

DYNAMIC POWER SCALING OF AN INTERMEDIATE SYMBOL BUFFER ASSOCIATED WITH COVARIANCE COMPUTATIONS

TECHNICAL FIELD

Embodiments of the present invention relate to apparatuses and methods for storing coded symbols associated with HSDPA data channels in a symbol buffer prior to being provided to a correlation core block, which performs covariance calculations.

BACKGROUND

In WCDMA receivers channel estimations are usually performed by measuring one or more pilot channels, wherein known data is transmitted. Under certain channel conditions, the channel estimates that result from measuring pilot channels are no longer precise enough for channel demodulation. Additional techniques have been created to estimate the channels more accurately so as to create high performance receivers. One such way to increase the precision of channel estimates is to base the channel estimations on the covariance (or correlation) between different fingers (delayed signal components) that are received on the data channels. In HSDPA, up to 15 data channels are transmitted at the same time. As such, an opportunity to compute the covariance between the different channels in order to improve channel estimates is available. It is well understood that computing a so-called covariance matrix for 15 data channels is a computationally complex and intensive task that utilizes a significant amount of memory, read and write power as well as microprocessor computational power in a battery powered computation device, such as a mobile communication device.

In the wide band CDMA standard, multiple channels are sent in parallel. These channels are both control channels (including pilot channels) and data channels, but for now we are discussing the data channels. Each data channel is identified by its own spreading code. By despreading the incoming data stream with the correct spreading code, one can extract the particular data of the channel of interest. In HSDPA (high speed data packet access) system, which is the high speed data extension of the original wide band CDMA standard, there are 15 data channels, wherein there is one spreading code for each of the 15 channels and all the channels are transmitted in parallel. An efficient technique for despreading all the coded channels from the received signals is to use a Hadamard despreader, also interchangeable referred to as a fast Hadamard transform (FHT). The FHT or Hadamard despreader is an efficient implementation of the process of despreading 16 symbols with 16 orthogonal codes of length 16. The Hadamard despreader or FHT generates 16 outputs, but it is understood that a FHT can have various sizes to produce more or less than 16 outputs. In a HSDPA, only up to 15 spreading codes are used, thus only 15 of the 16 Hadamard despreader outputs are needed.

A spreading code in the context herein is a vector of length 16, where every element is a complex value from the set (−1−j, −1+j, 1−j, 1+j). Furthermore, for the spreading and despreading to work properly, the spreading codes that are used are mutually orthogonal. There are 16 of these orthogonal codes of length 16; 15 of them are used in HSDPA.

In order to compute a covariance matrix from despread HS-PDSCH (High Speed Physical Data Shared Channel) data, one current solution uses a Hadamard despreader that executes sequentially on every rake finger, wherein each rake finger is essentially an offset in the received signal's sample stream. An intermediate symbol buffer (ISB) is used to buffer the despread data, which will ultimately be provided to a correlator core that computes the correlation between rake-finger combinations. The rake-finger is part of a rake receiver, which is a radio receiver designed to counter the effects of multipath fading. The rake receiver does this by using several subreceivers called "fingers". When a signal is transmitted, it often reflects off of buildings and other obstacles creating multipath fading. A rake receiver receives the original signal distorted by many, slightly delayed, copies of the original signal. The different delayed versions of the signal are referred to as "delayed paths". While the main component of a signal starts at a certain position in a sample stream, the signal is also present (although sometimes weaker, at about the same amplitude or stronger if not in line of sight), at slightly later points in the sample stream. These delayed paths carry some of the transmitted energy. In order to get the best reception quality possible, a receiver may be designed to capture as much of the transmitted energy as possible. A rake receiver is a type of receiver that tries to accomplish this in a very direct way. Essentially, the rake receiver rakes in all the signal energy that it can by processing (despreading) the signal at all the different offsets where a strong delayed path is present and then combining (using weighted addition) the results of these different offsets into one improved result. A "rake-finger" is basically a part of a receiver that receives one of a plurality of strong delayed signal paths.

Referring to FIG. 1 a despreading core that includes a Hadamard despreader 100 is depicted. 16 samples are input at the top of the Hadamard despreader. These 16 samples may originate from an A to D converter connected to the receiving antenna. The 16 input samples may also be referred to as chips, which is a name used in the art for the basic unit of transmission in WCDMA. For each code that one wants to extract data from, there is a correlation performed to a code of length 16 in order to get out one symbol. If there is an interest in all 15 codes, then a normal despreader procedure is repeated 15 times. A faster technique may be to utilize a fast Hadamard transform (a FHT), which reuses partial expressions from the 16 input samples and performs multiplication, addition and subtraction on such samples in order to produce 15 output symbols at the bottom. Thus, a fast Hadamard transform is an efficient way of correlating all 15 codes for HSDPA in one procedure. The output 102 comprises 15 symbols. Thus, sets of 15 symbols (each associated with a different code) are sequentially output from a Hadamard despreader.

The 15 symbol outputs 102 produced by the Hadamard despreader every clock cycle are written into an intermediate symbol buffer (ISB). Logically this is a very wide memory of (12+12)*15(codes)*2(symbols)*2(carriers)=1440 bits. For this example, the wide memory is thus 1440 bits wide in order to provide enough throughput to the correlator core(s). Other configurations of this type may require even wider memories or somewhat narrower memories depending on the size and number of codes, symbols and carriers to be correlated. FIG. 2 depicts an existing example of an ISB 30. The rake input 32 may be equivalent to the symbol output 102 of the Hadamard despreader. The rake input 32 provides 15 complex values (one value for each code and every value may be 12+12 bits). The 12+12 bits is associated with the precision of the real and imaginary parts of the output symbols coming from the Hadamard spreader. The 12+12 number of bits can be lower or higher depending on the implementation (e.g., between about 8+8 to 16+16 bits). Thus, in the example shown for each clock cycle a symbol that is 12+12 is provided for each of the 15 codes, which totals 360 bits that are output by the Hadamard spreader and provided to the intermediate signal buffer 30 via the rake 32 every clock cycle.

A selector 34 is used to map the symbols received from the rake 32 into a very wide memory space 36. The memory space 36 is, for example, 4 times as wide as the 360 bit symbols which equals 1440 bits wide. The selector 34 determines where in the 1440 bit memory space that each of the 360 bit symbols should be written. In this depicted mapping of FIG. 2, for one rake finger, 2 subsequent symbols for a first carrier are stored next to each other in a first memory 38. The first memory has a bit width of 720 bits. Meanwhile, for another finger 2 subsequent symbols of a second or different carrier are stored next to each other in a second memory 40 that is also 720 bits wide. Thus in this example, two different carriers (carrier 0 and carrier 1) are being processed simultaneously (Note that other similar configurations may operate with only one carrier or with more than two carriers). Here with two carriers, there is a carrier 0 memory bank 38 and a carrier 1 memory bank 40 for writing the symbols for each of the two carriers into an organized manner or matrix. Thus, when the rake 32 provides an output for carrier 0, symbol n, finger m that data is stored in a first 360 bit memory location 42. Then when another output for carrier 0 symbol n+1, finger m is provided by the rake 32, the selector 34 directs the output to be stored in memory location 44. This organized storage process is also performed for carrier 1 data provided by the rake 32. Thus, the selector 34 directs the all symbol data provided by the rake 32 such that it is written into a designated memory location in the ISB buffer where the data waits to be correlated.

In this example there are six symbols (n to n+5) stored for each carrier, for each finger. Furthermore there are 48 fingers (m to m+47) for which six symbols are stored in an organized fashion within memory space 36. It is understood that for this example the number of fingers, number of carriers, and the size of the data are all implementation choices that are selected by one of ordinary skill in the art. Here, buffering 6 symbols is done because the correlator cores consume data at a faster rate from the ISB 30 than the Hadamard despreader 100 produces data for the ISB 30. Since the consumption of data by the correlator cores cannot overtake the production of data from the Hadamard despreader 100, some amount of data needs to be buffered into the ISB 30 before the correlator cores start to process it. In this example, it was determined that six symbols of data need to be buffered before the correlator cores started processing it. In this implementation, the number of codes, being 15, is directly related to the communication standard for HSDPA.

The memory space 36 operates as an integral part of the symbol buffer 30 such that the rake 32 provides data into the memory space at one rate while the correlator (not specifically shown) is emptying or reading the data from all the next memory locations of the memory space 36 at another rate. Writing and reading all the memory locations of this prior art ISB 30 configuration at a clock rate of about 208 megahertz is an enormous energy drain on a mobile device's energy source or battery used in, for example, a mobile communication device.

FIG. 3 provides a correlation formula that is the basis for correlating signals from a pair of rake-finger. Also referring back to FIG. 2, the first memory 38 and second memory 48 act as buffers wherein symbol pairs "effectively" move from the rake 32, through the selector 34 and are written next to each other in designated memory locations in the memory space 36. The pairs of symbols are then read in the order of being stored (i.e., FIFO) by the appropriate correlator core, which performs a covariance calculation using the correlation formula of FIG. 3 for each pair of symbols.

In the correlation formula of FIG. 3 $R_d$ is the name given to a full correlation matrix that is indexed using $f_1$ and $f_2$, wherein $f_1$ and $f_2$ represent a first finger and a second finger that are being correlated with each other. The C is the set of active codes (wherein in this example there are 15 codes, but not all of them may be active); the c is a code number that is used in the summation of the active codes; $g_{f1}$ is the output of the Hadamard computation for the first finger; the i is the symbol number; $g_{f2}$ is the output of the Hadamard computation for the second finger, which is being correlated with $g_{f1}$. The correlation formula is a double summation wherein one summation is done for each active code in C and the second summation is done 160 times which reflects the number of symbols in each HSDPA slot. The correlation formula of FIG. 3 is performed for each element in the correlation matrix. Since this example matrix of FIG. 2 is a 48×48 matrix, relating to 48 fingers of the rake receiver being used to calculate the mutual correlations between all the 48 individual finger's symbol streams. This means that there are (48×49)/2 matrix elements. Thus, there are 15 codes*160 symbols=2,400 operations for each element in the matrix, which is an enormous number of computations (close to 3 million computations) necessary to compute the mutual correlation between all fingers, for all codes, for one carrier, for example to correlate all the symbols stored in the first memory 38 of the ISB to correlator core 0. The matrix elements are calculated every WCDMA slot. Thus, since the slot rate in WCDMA is 1500/sec, this amounts to a computational load of up to (48*49)/2*(15*160*2*1500)=about 8.5 Giga complex multiplications per second for 2 carriers. The same is also true for the second memory 40, which provides an intermediate symbol buffered information of a second carrier to correlator core 1.

Referring now to FIG. 4, a block diagram of a correlation core having a first correlation block 50 is depicted. The first correlation block 50 performs the summation of the active codes in the correlation formula of FIG. 3, but only for one symbol. Therefore the accumulator 52 accumulates the summation at the addition point 62 for 160 symbols.

The g(i,c) is multiplied by a 0 or a 1 via the active indicator m(c)=1 or 0 56, which indicates whether the symbol g(i,c) 54 is associated with an active or inactive code. If the code is active, g(i,c) is multiplied by a 1. If inactive g(i,c) is multiplied by a 0. The result is then multiplied 58 by the conjugate of $g_{f2}$ (i, c) 60. This method is repeated and is added for the 15 codes (i.e., up to $g_{fx}$(i, c+14). Thus, at the bottom of the block the addition element 62 accumulates 160 times into the accumulator 52.

Some correlation cores may include a second correlation block 64 as part of, for example correlator core 0, so that correlation block correlates a second symbol for carrier 0. Correlator blocks 50 and 64 together correlate 2 symbols for carrier 0, so that it takes 80 iterations to correlate 160 symbols (instead of 160 iterations. The second correlation block 64 provides a result 66, which is added to the first correlation block's output at addition element 62. In this manner, the dual correlation core blocks 50 and 64 process two symbols in one clock cycle such that 160 symbols are accumulated using the addition element 62, which only accumulates 80 times (instead of 160 times or 160 clock cycles). The single or dual correlator core blocks processes symbols in parallel while masking out codes (using the 0 or 1 multiplier in the m(c) to m(c+15) elements of a correlation core). The masked codes have already been written to and read from the ISB 30, but since they have been deemed as inactive or unnecessary in the correlation calculation these codes are masked from the correlation process in the correlation cores.

Thus, for every symbol associated with a code and finger written to and read from the ISB 30 there are 15 versions from the 15 codes, but the prior existing system can only mask codes determined to be unnecessary for a correlation calculation in the correlation core blocks.

Again, in order to perform the correlation computation once for one carrier (using a dual correlation core comprising correlation blocks 50 and 64), correlation block 50 takes 15 inputs (1 symbol per code) of 12+12 bits, which equals 360 bits in total. Correlation block 64 accepts the same number of bits for a second symbol. Correlation blocks 50 and 64 together accept 30 symbols of input (2 symbols per code) totaling 720 bits.

If there are two carriers, then the dual correlation core blocks 50 and 64 are duplicated to establish two dual correlation cores 50 and 64 and 50' and 64' (not specifically shown), wherein 60 symbols, or 1440 bits are consumed as input from the intermediate symbol buffer 30. It is important to understand that the inputs 54 (finger 1) change every clock cycle, while inputs 60, finger 2 stay constant. Referring to dual correlation blocks 50, 64, in a first cycle two symbols for finger combination (1,1). In the next clock cycle, symbol 2 for finger combination (1,2) is correlated; Then in the next clock cycle (1,3); Then (1,4) and so on. Again, since the first finger stays constant, inputs 60 don't change. Only inputs 54 are read from the ISB, which is 15 symbols for correlation block 50 (360 bits) and 15 symbols for block 64 360 bits The drawbacks of the above existing technique for performing correlation or covariance computations are various. First there is the problem of time and timing. That is, an entire matrix must be calculated within the time of one slot of 160 symbols. A slot in WCDMA consists of 2560 chips. With an SF of 16, this means that a slot contains 2560÷16=160 symbols per code. In other words, two symbol pairs must be provided to the correlation core (720 bits+720 bits=1440 or 60 symbols) each clock cycle by the intermediate symbol buffer 30 just to keep up with the correlation cores computation rate. The speed and movement of the data is very important here because the data is being used for channel estimation wherein the result of the channel estimation computations are most valuable if the channel estimation result is determined before the channel changes. It is important to have the channel estimation in time before the estimation becomes irrelevant due to channel changes, which occur regularly in mobile communication devices.

When, for example, the correlation core's clock frequency is about 208 MHz then 1440 bits must be moved from a very wide 1440 bit memory to the intermediate symbol buffer 30 every 4.8 microseconds, which is a large power drain on a mobile device's battery system. By calculating the amount of energy required to read 1440 bits from a memory and then multiplying that number by the clock rate of 208 MHz, it was determined that the process required too large of a mW drain on a portable communication device's battery for performing just this correlation computation operation. What is needed is an intermediate symbol buffer design and method for writing symbols associated with spreading codes, provided by a Hadamard despreader into an intermediate symbol buffer and read from the same intermediate symbol buffer in a manner that consumes significantly less power than the pre-existing techniques.

SUMMARY

In view of the limitations and shortcomings of the aforementioned system and method of loading symbols provided by a Hadamard despreader into an intermediate symbol buffer in a manner that consumes too much power from a portable communication device's battery as well as other disadvantages not specifically mentioned, it is apparent that there exists a need for a design for an intermediate symbol buffer adapted to receive symbols associated with the 15 codes used in HSDPA, but that reduces power consumption by only writing and/or reading the symbols associates with spreading codes that are deemed necessary for a covariance or correlation calculation into the ISB or from the ISB By minimizing the number of reads and writes into and out of an exemplary ISB, the amount of power used may be significantly decreased when compared to writing and reading all symbols associated with all spreading codes into and out of a prior ISB buffer.

Some embodiments of the invention are directed toward a system and method that partitions received symbols in accordance with their related spreading codes in a manner such that if one or more spreading codes are determined to be not needed for a correlation or covariance calculation, then such symbols associated to the unneeded spreading codes may be masked, not stored in a symbol buffer and/or have the memory blocks associated with the storage of such un-needed spreading codes power down or placed in a low power state in order to conserve overall mobile communication device power.

Various embodiments of the invention provide an intermediate symbol buffer (ISB) that comprises a selector adapted to receive sets of symbols from a rake, wherein each symbol is associated with one of a plurality of spreading codes, and wherein each set of symbols is associated with one of (f) fingers and one of (c) carriers. Further, a buffer is adapted to buffer a predetermined number of sets of symbols from the selector. The predetermined number of sets of symbols comprises a first number of symbols associated with each one of the plurality of spreading codes from one of the (f) fingers and at least one of the (c) carriers. A plurality of memory banks are partitioned such that symbols associated to a same spreading code of the plurality of spreading codes are written into a same partition associated with the same spreading code.

In another embodiment an intermediate symbol buffer (ISB) configuration is provided that comprises a selector adapted to receive sets of 15 symbols from a rake, wherein each symbol is associated with one of 15 spreading codes, and wherein each set of 15 symbols is from one of (f) fingers and one of (c) carriers. A buffer is provided to buffer four of the sets of 15 symbols (i.e., 60 symbols) from the selector, wherein the four sets of 15 symbols comprises two symbols associated with each one of the 15 spreading codes from one of the (f) fingers and two of the (c) carriers. A plurality of memory banks are partitioned to have 15 partitions such that symbols associated to a same spreading code of the 15 codes are written into a partition associated with the same spreading code. Furthermore in some embodiments, each one of the 15 partitions comprises a memory width that is wide enough to store two symbols from one of the (f) fingers from two of the (c) carriers for a total partition memory (word) width of four symbols associated with a same spreading code.

Additionally, the selector is adapted to mask symbols associated with a code that is unnecessary for performing a covariance calculation. In other embodiments, the buffer, instead of the selector, is adapted to mask symbols associated with a code that has been determined to not be included in a subsequent covariance calculation.

The exemplary ISB configuration's plurality of memory banks may equal 15 memory banks, wherein each memory bank comprises one of the 15 partitions and is designated for one of the 15 spreading codes.

An exemplary ISB configuration may comprise one or more memory banks, of the plurality of memory banks, adapted to be placed in a low power or off state when the symbols in the partitions of the memory bank are associated with spreading codes that have been determined to not be included in a subsequent covariance calculation.

In another embodiment the ISB configuration further comprises a covariance block that is adapted to selectively read symbols from partitions associated with spreading codes selected for inclusion in a covariance calculation in the covariance block.

In yet another embodiment the buffer within the ISB is adapted to reorder the symbols such that symbols associated with codes necessary or needed for a covariance calculation are grouped to be written partitions comprised within a number of memory banks that is less than the total number of the plurality of memory banks.

In another embodiment, wherein each memory bank has a plurality of partitions, an intermediate symbol buffer (ISB) configuration is provided that comprises a selector adapted to receive sets of symbols from a rake, wherein each symbol is associated with one of a plurality of spreading codes, and wherein each set of symbols is associated with one of (f) fingers and one of (c) carriers. A buffer is provided and adapted to buffer a predetermined number of sets of symbols from the selector, wherein the predetermined number of sets of symbols comprise a first number of symbols associated with each one of a plurality of spreading codes from one of the (f) fingers and at least one of the (c) carriers. This embodiment also comprises a plurality of memory banks, wherein each memory band is partitioned into at least two partitions, wherein symbols associated to a same spreading code are written into a same partition within one of the plurality of memory banks.

Another embodiment comprises a mobile communication device. The mobile communication device comprises a rake receiver that is adapted to receive data from a plurality of fingers. The rake receiver is further adapted to despread the date or chips from each of the plurality of fingers and to produce an output sequential sets of, for example 15, symbols wherein each symbol in a set of symbols is associated with a different spreading code of a plurality of, for example 15, spreading codes and a same carrier of a plurality of carriers from a same finger of a plurality of fingers. The exemplary mobile communication device further comprises an intermediate symbol buffer (ISB) block that comprises a selector adapted to sequentially receive the sets of symbols from the rake receiver output. Furthermore, a buffer is provided and adapted to receive and buffer a predetermined number (e.g., 2 to 8) sequential sets of symbols from the selector, wherein the predetermined number of sequential sets of symbols comprises a first number of symbols associated with each one of the plurality of spreader codes from the same finger of the plurality of fingers and one or more of the plurality of carriers. Additionally, a plurality of memory banks are adapted to have sets of symbols written to the plurality of memory banks from the buffer, the plurality of memory banks being partitioned into a number of partitions such that symbols associated with a same spreader code of the plurality of spreader codes are written into partitions associated with the same code. This exemplary mobile communications device further comprises a covariance core that is adapted to correlate a first number of sets of symbols from one finger of the plurality of fingers with a second number of corresponding sets of symbols from a second finger of the plurality of fingers. Additional embodiments may comprise additional covariance cores for correlation of sets of symbols from additional carriers.

Another embodiment provides a mobile communication device wherein the selector is further adapted to mask symbols associated with a spreading code that has been determined to not be included in subsequent correlation calculation by the correlator core. In yet other embodiments, the buffer, instead of the selector, is adapted to not mask symbols and/or only write such symbols associated with codes determined to be included in a subsequent correlation calculation by the correlation core.

In some embodiments a method of processing symbols through an intermediate buffer is provided, wherein the symbols are provided in sets of symbols and each symbol in a set of symbols is associated with a different one of a plurality of spreading codes. Each set of symbols is from one of a plurality of rake-fingers and one of a plurality of carriers. The method comprises: (a) receiving sequentially by a selector sets of symbols; (b) sequentially buffering, by a buffer, a predetermined number of sets of symbols received from the selector, such that the predetermined number of sets of symbols each comprise a first number of sets of symbols associated with one carrier from one finger and a second number of sets of symbols associated with another carrier from the one finger and; (c) writing the predetermined sets of symbols, from the buffer, to a number of memory partitions logically organized in a plurality of memory banks such that the symbols associated with a same spreading code of the plurality of spreading codes are written into a memory partition, of the number of memory partitions, associated with the same spreading code.

In additional embodiments of the method, the plurality of memory banks are equal in number to the plurality of spreading codes and each of the memory banks comprises one memory partition. Additional methods further comprise setting a memory bank, o the plurality of memory banks, to a low power state when all the memory partition(s) in the memory bank are associated with the same spreading codes of the plurality of spreading codes that have been determined to not be included in a subsequent covariance calculation.

BRIEF DESCRIPTION OF THE DRAWINGS

Other objects, features, and characteristics of embodiments of the invention as well as methods of operation and functions of related elements of structure, and the combination of parts and economics of manufacture, will become apparent upon consideration in the following description and appended claims with reference to the accompanying drawings. All of which form a part of this specification wherein like reference numerals designate corresponding parts in the various figures, and wherein:

FIG. 6 depicts another exemplary intermediate symbol buffer comprising memory partitioning in accordance with embodiments of the invention.

DETAILED DESCRIPTION

Taking into consideration that in certain circumstances not all of the spreading codes are needed to perform correlation calculations, power can be saved if the symbols associated with spreading codes that are determined to not be needed in an upcoming correlation or covariance computation are not written to or read from an intermediate symbol buffer. A possible reason why certain symbols associated with certain spreading codes may not be needed or necessary for use in a correlation or covariance computation may be because in certain environmental conditions the estimates existing from the use of the pilot channels and/or previous correlation calculations are considered accurate enough such that additional correlation calculations may need only to be performed using a few spreading codes (e.g., less than all 15 spreading codes). Furthermore, there is generally only a need to perform channel correlation using all 15 spreading codes in difficult reception environments such as environments that include multiple buildings, towers or other man made or natural structures that cause multiple signal reflections. Thus, if the pilot channels alone or the pilot channels combined with the correlation of a few spreading codes provides an accurate enough channel estimate, then symbols associated with other spreading codes need not be written to or read from an ISB or used by a subsequent correlation core calculation.

Figure 1:
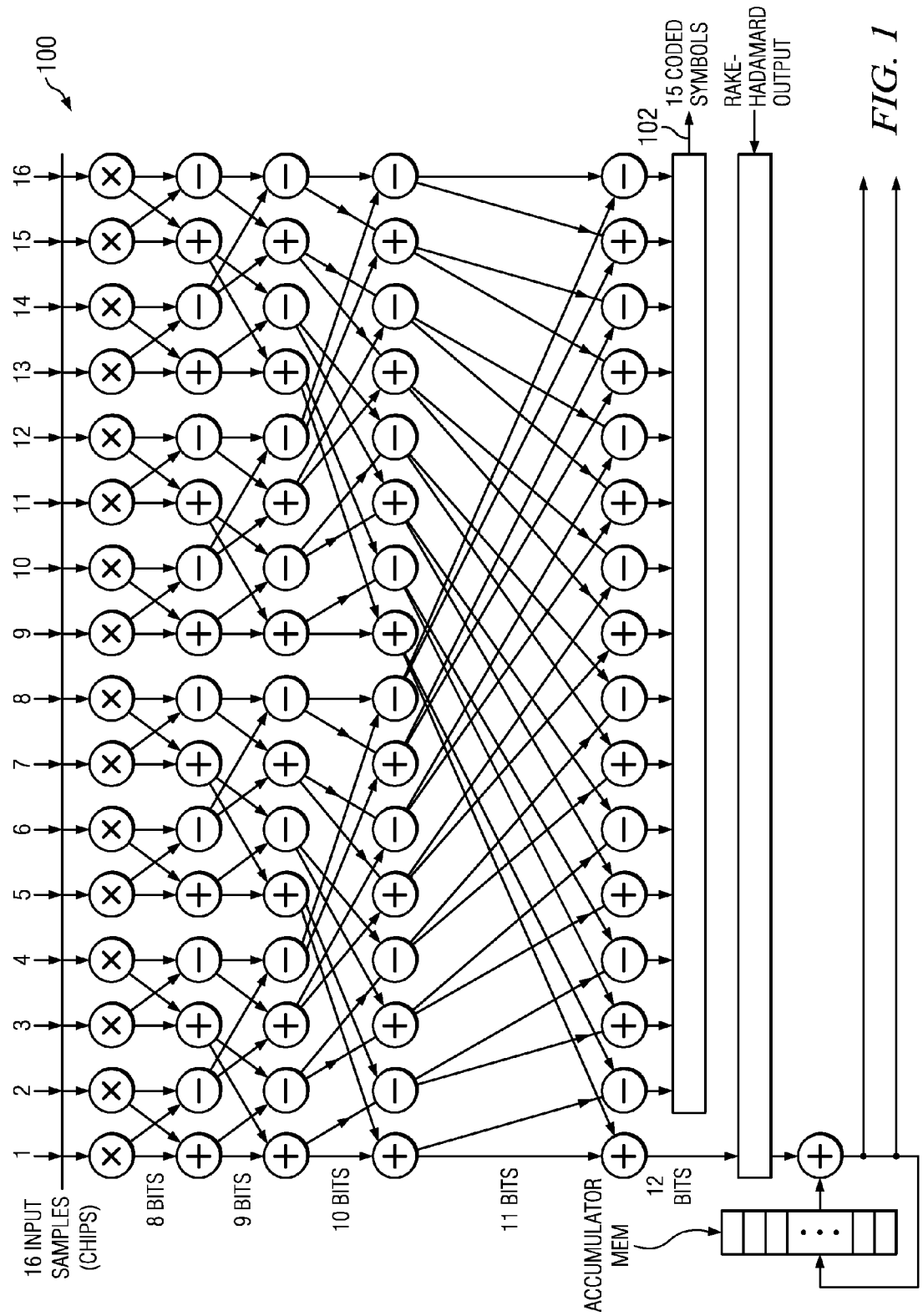
FIG. 1 depicts the basic structure and operation of a despreading core that includes a Hadamard despreader.
Figure 2:
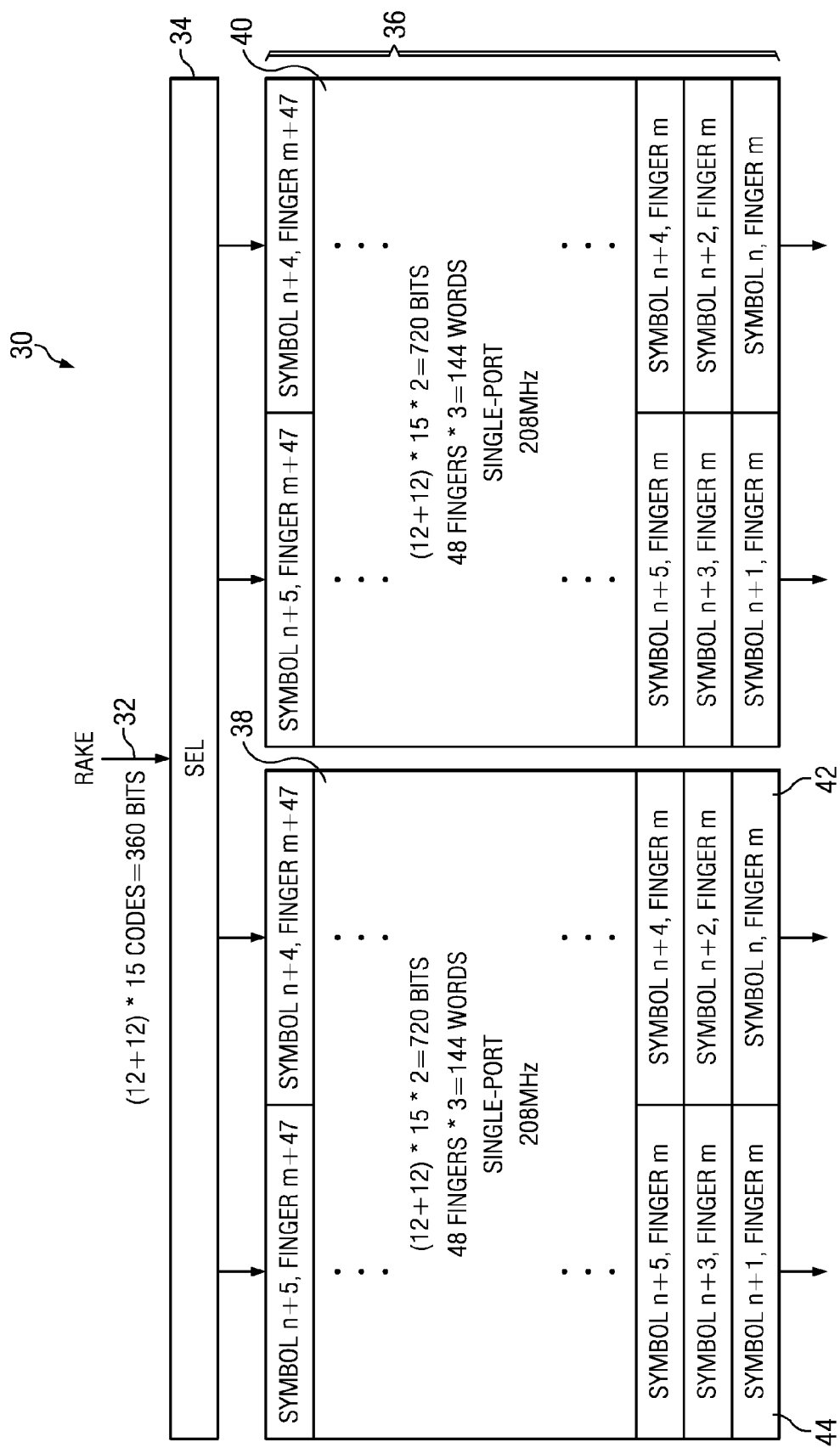
FIG. 2 depicts a block diagram of a prior art intermediate symbol buffer configuration.
Figure 3:
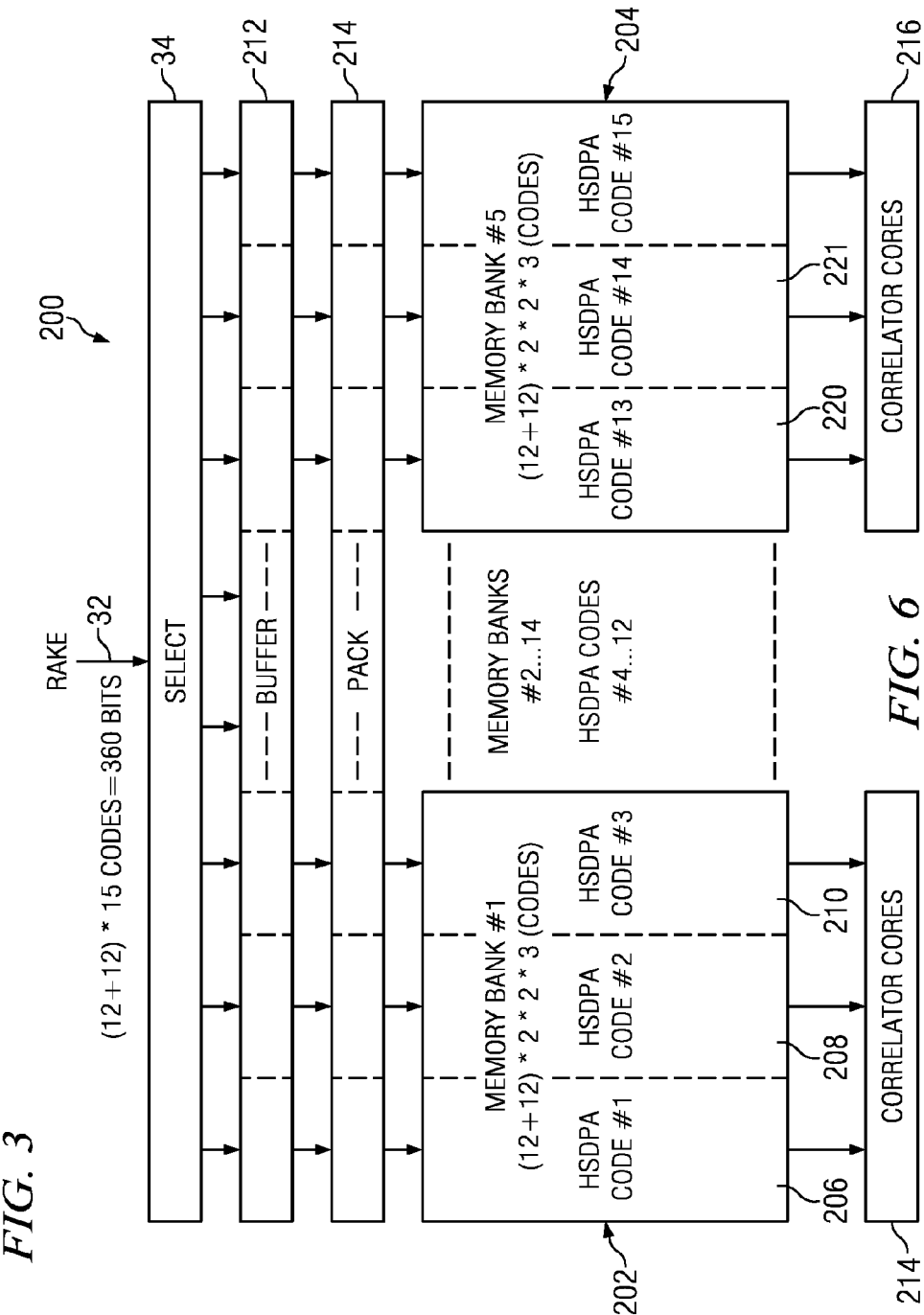
FIG. 3 depicts an underlying formula used to perform correlation calculations for one pair of rake-fingers.
Figure 4:
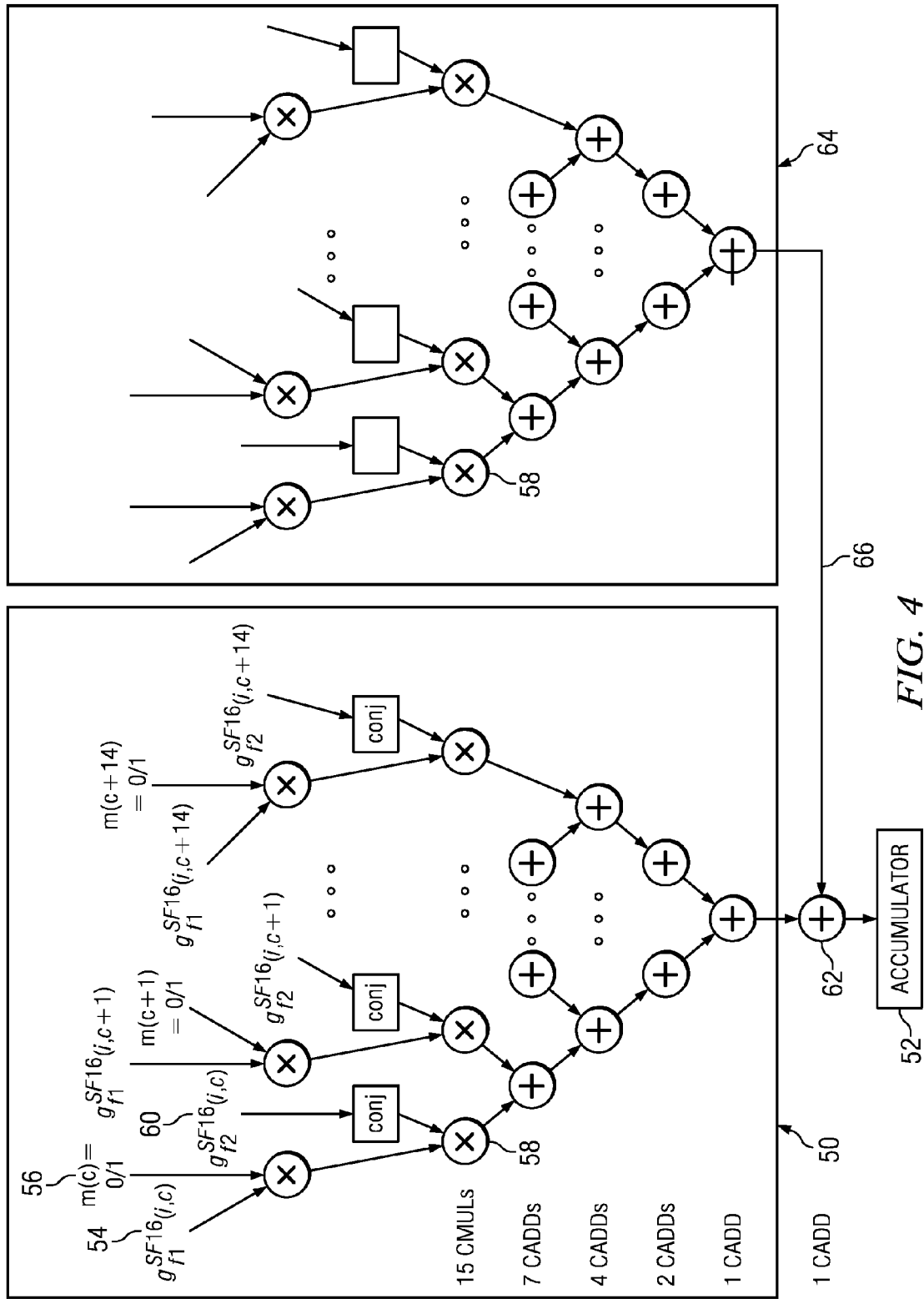
FIG. 4 shows an exemplary structure of a correlation core.

It is understood that the preexisting ISB 30 of FIG. 2 does not support selectively reading symbols associated only with specific spreading codes. This is because the preexisting ISB 30 is set up such that a read cycle reads all 1440 bits at each clock cycle.

Figure 5:
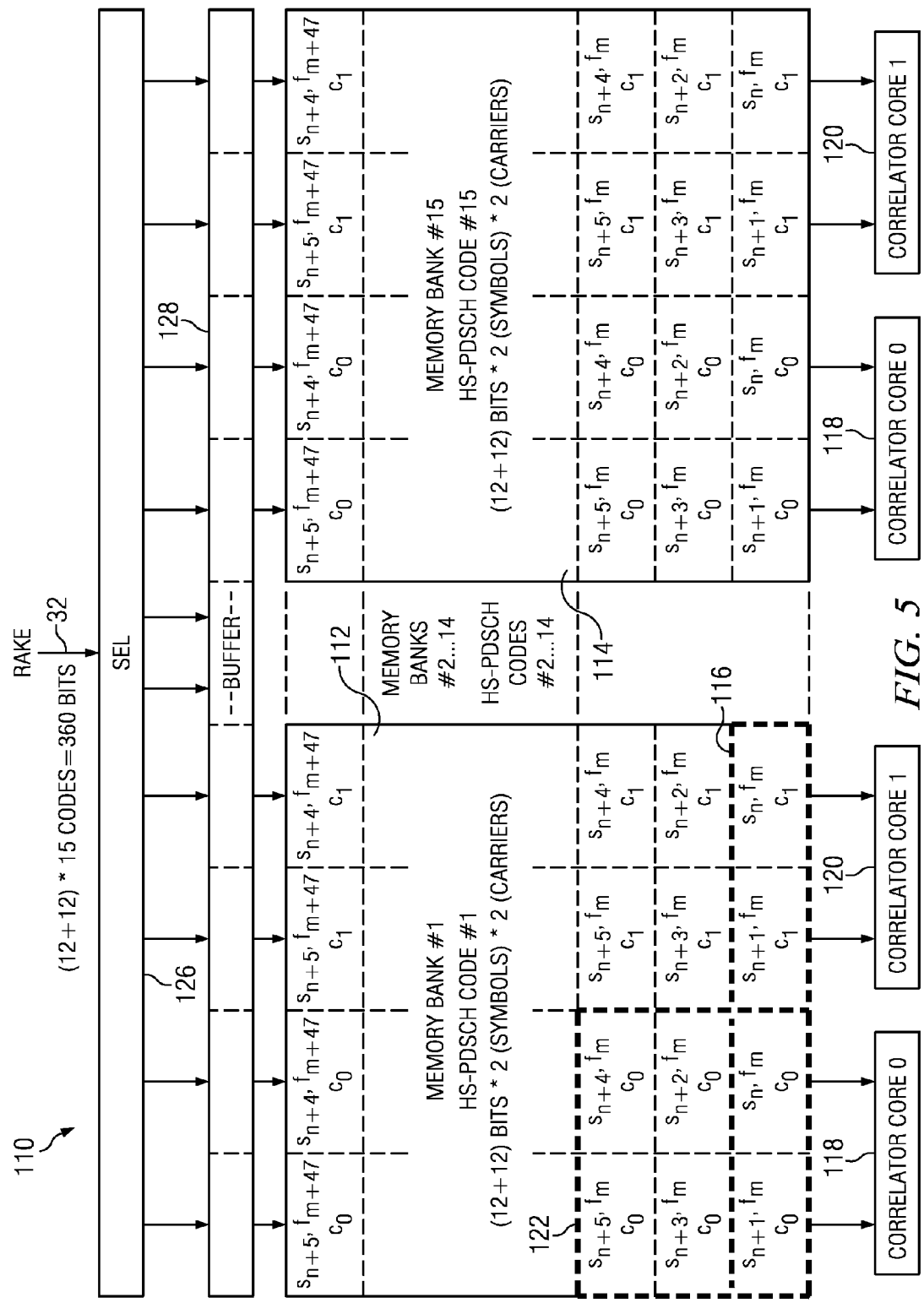
FIG. 5 depicts a block diagram of an exemplary intermediate symbol buffer comprising physical memory partitions in accordance with an embodiment of the invention.

Referring now to FIG. 5 a block diagram of an exemplary ISB 110 is depicted wherein an exemplary memory layout is provided such that there are 15 memory banks, one for each of the 15 spreading codes. For example, memory bank one 112 contains all the symbols associated with spreading code 1 and memory bank fifteen 114 contains all of the symbols associated with spreading code 15. In this manner, every memory bank one through fifteen contains symbols for both carriers that are to be correlated (i.e., carrier 0 and carrier 1). In the exemplary ISB 110, the memory partitioning is based on symbols associated with particular spreading codes (rather than symbols associated with particular carriers). Each memory bank or partition 1 through 15 is designated to contain only symbols associated with 1 of the 15 spreading codes and therefore must also contains symbols for both carriers. Note that in total there are 15 memory banks or partitions, but FIG. 5 only shows memory bank one 112 and memory bank fifteen 114, which are, in this embodiment, designated to contain the symbols associated with HSDPA spreading codes 1 and 15. Each memory bank in this embodiment is 96 bits wide with the total width of all 15 memory banks being 1440 bits. Every memory word 116 in each memory bank contains 2 symbols and from one of the (f) fingers from two of the (c) carriers for a total partition memory word width of 4 symbols associated with a same spreading code. Each HSDPA spreading code number is stored in a designated memory bank 1 through 15. The symbols for different carriers (c0 or c1) are sent to different correlator cores such as correlator core 0 118 for the first carrier c 0 and correlator core 120 for the second carrier c1. The partitioning of an exemplary memory bank is flexible and may depend on, for example timing or data throughput requirements. In this exemplary embodiment, throughput requirements require the exemplary ISB 110 and correlator cores 118, 120 to read and correlate at least 4 symbols per spreading code every clock cycle. It is noted that in a single carrier scenario each memory bank or memory partition layout can be modified such that each memory word 116 comprises 4 symbols associated with a same spreading code that are from or associated with one carrier and perhaps 2 fingers. It is further noted that some embodiments may write symbols associated with 3 to 6 carriers associated with a same spreading code to a designated memory bank or memory bank portion. Buffering of additional carriers will, of course, make the memory width larger.

In this embodiment, for each ($f_m$) finger there are 6 symbols stored for each carrier and each spreading code 122. This can be true for carrier 0 and carrier 1 in memory banks 1 through 15. Furthermore, 6 symbols ($s_n$ to $s_{n+4}$) are stored for 48 different fingers ($f_n$ to $f_{n+47}$). It is understood that the storing of the six symbols for each finger is arbitrary, but is a basis for the accuracy of the designed implementation for correlation. In this exemplary embodiment, six symbols are stored for each carrier in order to provide adequate decoupling or buffering between the rake receiver's providing of data to the ISB 110 and the correlator's reading of data from the ISB 110. Less buffering of data in an exemplary ISB may cause the correlation process to stall due to the correlation processes consuming data faster than the rake receiver output 32 can fill the ISB. Furthermore the number of fingers (48) is based on the design of the rake receiver.

Since the memory banks or memory partitions 1 through 15 are organized based on spreading codes (instead of based on carriers), then when a particular spreading code is determined to be unnecessary, unneeded, or not to be included in an upcoming correlation calculation the unneeded or unnecessary spreading code(s) are not read from the memory bank containing such symbols associated with the unnecessary codes. Thus, if code 1 is not needed in a correlation calculation then the data contained in memory bank one 112 is not read and provided to correlator core 0 118 or correlator core 1 120. In some embodiments, when it is determined that a particular code, for example code 1, is not needed for the correlation calculation, the memory bank one 112 can be powered down or placed in a low power state such that symbols cannot be written to the memory bank or read from the memory bank during the correlation calculation time frame that the particular code is not necessary for a correlation calculation. If it is determined that multiple spreading codes, for example codes 1, 2, 7 and 15 are not needed for a correlation calculation, then memory banks 1, 2, 7 and 15 do not need to be read by the correlator cores and, in some embodiments, the particular memory banks 1, 2, 7 and 15 may be powered down or placed in a low power state so that less power is used. In essence, each time a memory bank partition containing an unneeded spreading code for correlation is not read, then 96 bits of the original 1440 bits are not read each clock cycle for correlation calculations. The more spreading codes that are not needed for a particular correlation calculation, the less writing and reading of memory banks is performed. And, the more memory banks that can be powered down for a period of clock cycles.

In additional embodiments and looking at the input side of the exemplary ISB 110, the rake 32 provides 15 symbols from the Hadamard despreader in a sequence. Each set of 15 symbols comprises one symbol per spreading code, for one finger and one carrier. In other words, each of the 15 symbols in a set is associated with a different one of the 15 spreading codes wherein each set of the 15 symbols is from one of the ($f_m$) fingers and one of the (c) carriers. One set of 15 symbols is only a quarter of the total width of the exemplary ISB 110. The selector 126 receives the sets of 15 symbols from the rake 32. Each one of the 15 symbols in each set of symbols coming from the rake will end up in a different memory bank because each is associated to a different spreading code of the 15 spreading codes. To reduce the write access frequency from the selector to the 15 memory banks of the ISB 110, a 1440 bit wide buffer 128 is provided to sequentially buffer 60 symbols or four sets of 15 symbols received from the selector such that the four sets of 15 symbols each comprise two sets of 15 symbols associated with one carrier from one finger and two sets of 15 symbols associated with another carrier from the same one finger. (i.e., two symbols per spreading code, from one finger, for two carriers). Once the four sets of 15 symbols are in the buffer 128, then the symbols are written to the memory banks or memory partitions 1 through 15 based on the spreading code associated with each symbol. In some embodiments, if it is determined that certain spreading codes are not going to be needed or used in the subsequent correlation or covariance calculations, then the memory bank associated with the unneeded spreading codes can be disabled or placed into a low power state so as to prevent the memory bank from consuming dynamic power during the write process.

In additional embodiments, when it is known or determined that certain spreading codes are not going to be used in the subsequent correlation calculation, the certain unneeded spreading codes can be discarded from the output of the Hadamard despreader so that the symbol associated with the unneeded spreading code is not written into any memory bank or memory partition of the ISB 110. In some embodiments, when it is time to write the symbols associated with spreading codes from the buffer register 128 to the ISB memory blocks or partitions, a 15-bit mask value can be used to determine to which of the 15 memory banks or partitions a write command has to be sent. The 15-bit mask may have one bit per bank, such that the bit indicates if the bank should (1) or should not (0) be written to.

Besides masking or presenting write commands from specific portions of the buffer register 128 to the ISB memory banks or partitions for the unused or unnecessary spreading codes, the mask value can also be used to turn on or off the power supply (clock-gate) to the unused memory banks to prevent them from consuming any power at all. Since a correlation or covariance calculation is performed over dozens of symbols (an exemplary embodiment uses 160 symbols) and a spreading code that has been determined as not to be included in or unnecessary for use in a correlation calculation will remain unnecessary for the entire duration of that correlation calculation. This means that the mask value that controls the access to the memory banks and the clock gating will be stable for the entire duration of a correlation. Thus, this clock-gating approach is an attractive solution because it means that the entire memory bank can be turned off (unpowered) for dozens of clock cycles thereby using significantly less power from the batteries of a mobile device.

In yet in another embodiment, the one-to-one correspondence between a spreading code number and a memory bank number can be removed. Furthermore, since it is more expensive to implement a plurality of small memory banks than it is to implement a fewer number of larger memory banks, it may be further advantageous to use less than 15 memory banks. For example the manufacturing cost and/or space utilized by 15 memory banks is higher than the cost and/or silicon space associated with, for example, five larger memory banks. In another embodiment, five larger memory banks can be used in a manner such that symbols associated with multiple spreading codes are written into a plurality of partitions in a single memory. Referring to FIG. 6, a block diagram of an exemplary ISB 200, which utilizes memory partitioning, is depicted. In this embodiment, there are five memory banks but the figure only specifically shows memory bank one 202 and memory bank five 204. Each memory bank is partitioned into three partitions such that symbols associated with three different spreading codes (of the 15 spreading codes) can be mapped to each memory bank. For example, memory bank one 202 can have 3 partitions, a first partition 206 for symbols associated with a first spreading code, a second partition 208 for symbols associated with a second spreading code, and a third partition 210 for symbols associated with a third spreading code. Likewise memory banks 2, 3, 4 and 5 (not all specifically shown) may be partitioned similarly so that symbols associated with three different spreading codes can be mapped there into. Memory bank 2 may be partitioned for symbols associated with a fourth, fifth and sixth spreading code; memory bank 3 may be partitioned with a seventh, eighth and ninth spreading code; memory bank 4 may be partitioned for symbols associated with a tenth, eleventh and twelfth spreading code and; memory bank five 204 may be partitioned for symbols associated with a thirteenth, fourteenth and fifteenth spreading code.

In this embodiment, the organization of the symbols associated with the spreading codes and fingers is similar to that of the organization of the symbols in the embodiment depicted in FIG. 5, except that the memory banks here in FIG. 6 are partitioned to map more than just one spreading code per memory bank. The advantages of this embodiment are that there are fewer memory banks of larger size as compared to the fifteen memory banks of smaller size of the previously discussed embodiment. By using fewer memory banks of larger size the design and/or memory bank parts are less expensive and/or consume less area on silicon.

Furthermore, although there can be situations, as discussed in the embodiment of FIG. 5, wherein symbols associated with certain spreading codes are not needed or necessary for correlation calculation, in this embodiment an entire memory bank cannot be effectively powered down or placed in a lower power state unless the spreading codes of all three spreading code partitions are determined to be unneeded or unnecessary for a correlation calculation.

In this embodiment, with five physical memory banks partitioned to map the symbols of three spreading codes to each bank, each memory bank will be 288 bits wide and the total width of all five memory banks will be still 1440 bits. Every memory word of each memory bank now contains two symbols from one finger, for three spreading codes and for two carriers for a total of twelve symbols per word.

In this embodiment, without the one-to-one correspondence between physical memories and spreading code partitions, minimizing the number of writes and reads to the ISB memory banks can be performed in a manner such that the distribution of memory partitions for each spreading code over the physical memory banks is organized (or reorganized) such that the least number of memory banks are storing symbols associated with spreading codes that are necessary or needed for the correlation calculation. For example, if symbols associated with only the spreading codes 1, 4, 7, 10 and 13 are needed and the memory banks 1-5 are partitioned such that symbols associated with spreading codes 1, 2 and 3 are in memory bank 1; spreading codes associated with 4, 5 and 6 are in memory bank 2 and so forth such that symbols associated with spreading codes 13, 14 and 15 are partitioned in memory bank 5, then all five memory banks would need to be written to by the buffer 212 and read from by the correlator cores 214 and 216. To avoid having to write to and read from all five memory banks in such a situation the buffer 212 can be directed to reorder the data before it is written into the memory partitions such that symbols associated with spreading codes that are determined to be needed or necessary for a correlation calculation are stored in the least number of memory banks, which may be less then the total number of memory banks. In this example, a goal of the reordering could be to store the symbols associated with spreading codes 1, 4 and 7 in the memory partitions of memory bank one 202 and the symbols associated with spreading codes 10 and 13 in partitions in memory bank five 204. In this way only two memory banks would need to be accessed for writing and reading instead of all five (as would have been the case without the reordering). In other embodiments the reordering could be essentially the packing of the memories from left to right or right to left. For example, in a packing of the memories from left to right, symbols associated with spreading codes 1, 4 and 7 would be stored in the three memory partitions 206, 208, 210 of memory bank one 202 while the symbols associated with spreading codes 10 and 13 are stored in a fourth and fifth (i.e., first and second) memory partition within memory bank two (not specifically depicted).

Thus, in this exemplary embodiment the rake (Hadamard despreader output 32) produces a sequence of 15 symbols (1 symbol per spreading code, for one finger and one carrier). This is only a quarter of the total width of the ISB 200. Each symbol of the sets of 15 symbols coming from the rake 32 will end up in a different memory bank partition because each one of the 15 symbols is associated to a different spreading code. To reduce the write access frequency to the ISB, four sequential sets of 15 symbols are introduced from the selector 34 to a 1440 bit wide buffer where a total of 60 symbols (two symbols per code, from one finger, for two carriers) are held before they are potentially written to the pack block 214 or the ISB in a single write access. In some embodiments the pack block 214 is part of the buffer 212. Symbols associated with the spreading codes that have been determined to not be needed or are unnecessary for the correlation calculation may be masked at the selector 34 or the buffer 212. The buffer block 212 organizes the symbols received from the selector by their associated spreading codes. The unmasked spreading codes, that is the spreading codes associated with the bit mask value wherein a (1) bit is associated with each of the 15 spreading codes that is to participate in the correlation calculation are then provided to the pack block 214. Codes that are not to participate in the correlation calculation may be masked via a (0) bit for each of the 15 spreading codes that are not to be written past the buffer and into any of the partitions of the memory banks. The pack block 214 is adapted to operate such that it reorders spreading coded symbols provided from the buffer register 212 such that all symbols associated with spreading codes that are to be written to a partition of a memory bank are packed to the left, right or in a manner such that a minimum number of the available ISB memory banks are used or the number of ISB memory banks is greater than 1, but less than the total number of spreading codes (e.g., 15 codes) being used by, for example, WCDMA or another wireless communication standard. The reorder or packing block 214 may comprise combinatorial logic (mostly barrel-shifters and muxes) that, based on the 15 bit mask value, packs all symbols associated with a spreading code that should be written to a memory partition to the left or right hand side of the vector or in a manner that the least number of memory banks will be written to.

Once the symbols associated with spreading codes that are needed for the correlation calculation have been reordered in a manner that requires the least number of memory banks, the symbols associated with the spreading codes are written to the partitions associated with the particular spreading codes in the ISB memory banks such that as few memory banks are activated as possible. Assuming that the exemplary ISB 200 is implemented with five memory banks each containing three memory partitions for three spreading codes, then from the example above, one embodiment may place the symbols associated with spreading code 1, 4 and 7 in the first, second and third partitions (206, 208, 210) of the first memory bank 202 and place symbols associated with spreading codes 10 and 13 into two of the partitions in one of the other four memory banks for example the first and second memory partitions (220, 221) of the fifth memory bank 204. The remaining memory banks, meaning memory banks 2, 3 and 4, can be shut down or placed in a low power state while the correlation calculation is performed for the selected spreading codes and their associated symbols.

The correlation cores 214 and 216 receive the symbols associated with spreading codes 1, 4, 7, 10 and 13 from memory bank one 202 and memory bank five 204 in order to perform the correlation or covariance calculations.

The concept of reordering the data before writing it to an ISB can be extended further to the point where logical and physical memory partitions become completely independent. By always packing the symbols associated with the spreading codes needed for the correlation calculation in a manner such that the least number of physical memory banks are used, irrespective of how many memory banks there are and what their storage dimensions are, it can be ensured that the minimum number of memory banks will always be written to and read in an exemplary ISB configuration thereby resulting in power savings. The width of the physical memories do not have to fit with the logical width necessary for storing 15 symbols associated with 15 spreading codes for a ($f_m$) number of fingers and (c) number of carriers. For example, an embodiment could be implemented with a 1440 bit wide ISB with 10 144-bit physical memory banks. If five spreading codes are needed in the covariance calculation, 5*96=480 bits that would have to be stored. By packing these 480 bits into the first four physical memory banks, three of the four memory banks would be filled entirely and the fourth memory bank would have a width of only 48 bits used. This generalization has the advantage that it can be adapted to any physical memory size if, for example, only certain memory sizes are available.

It would be appreciated by those skilled in the art having the benefit in this disclose that this dynamic power scaling of covariance computations provides a novel intermediate symbol buffer configuration that can utilize significantly less power than prior ISB configurations due to the fact that all symbols associated with spreading codes are not buffered in an exemplary ISB. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, design choices, and embodiments apparent to those of ordinary skill in the art without departing from the subject matter and scope hereof, and as defined by the following claims. Thus, it is intended that the following claims be interpreted to embrace all such further modifications, changes, rearrangements, substitutions, alternatives, design choices and embodiments.

What is claimed is:

1. An intermediate symbol buffer (ISB) configuration comprising:
 a selector adapted to receive sets of symbols from a rake, wherein each symbol is associated with one of a plurality of spreading codes, and wherein each set of symbols is associated with one of (f) fingers and one of (c) carriers;
 a buffer adapted to buffer a predetermined number of the sets of symbols from the selector, wherein the predetermined number of sets of symbols comprise a first number of symbols associated with each one of the plurality of spreading codes from one of the (f) fingers and at least one of the (c) carriers;

a plurality of memory banks partitioned into a number of partitions such that symbols associated to a same spreading code of the plurality of spreading codes are written into a same partition associated with the same spreading code; and a memory bank of the plurality of memory banks is adapted to be placed in a low power state when the symbols in the memory bank are associated with spreading codes that have been determined to not be included in a subseiuent covariance calculation.

2. The ISB configuration of claim 1, wherein the selector is further adapted to mask symbols associated with a spreading code that has been determined to not be included in a subsequent covariance calculation.

3. The ISB configuration of claim 1, wherein the buffer is further adapted to mask symbols associated with a spreading code that has been determined to not be included in a subsequent covariance calculation.

4. The ISB configuration of claim 1, wherein the plurality of memory banks are equal to 15 memory banks and wherein each memory bank comprises one of the number of partitions.

5. The ISB configuration of claim 1, further comprising a covariance block adapted to selectively read symbols from partitions associated with spreading codes selected for inclusion in a covariance calculation in the covariance block.

6. The ISB configuration of claim 1, wherein the buffer is adapted to reorder the symbols such that symbols associated with spreading codes selected for inclusion in a covariance calculation are grouped to be written to partitions within less than the plurality of memory banks.

7. The ISB configuration of claim 6, wherein a covariance core reads only the symbols written to partitions within less than the plurality of memory banks.

8. A mobile communication device comprising:

a rake receiver adapted to receive data from a plurality of fingers, the rake receiver being further adapted to despread data from each one of the plurality of fingers, and to produce an output comprising sequential sets of symbols, wherein each symbol is associated with a different spreading code of a plurality of spreading codes and a same carrier of a plurality of carriers from a same finger of the plurality of fingers;

an intermediate symbol buffer (ISB) block comprising:

a selector adapted to sequentially receive the sets of symbols from the output;

a buffer adapted to receive and buffer a predetermined number of sequential sets of symbols from the selector, wherein the predetermined number of sequential sets of symbols comprises a first number of symbols associated with each one of the plurality of spreading codes from the same finger of the plurality of fingers and one or more of the plurality of carriers; and a plurality of memory banks adapted to have sets of symbols written to the plurality of memory banks from the buffer, the plurality of memory banks being partitioned into a number of partitions such that symbols associated with a same spreading code of the plurality of spreading codes are written into a partition associated with the same spreading code; and a covariance core adapted to correlate a first number of sets of symbols from one finger of the plurality of fingers with a second number of corresponding sets of symbols from a second finger of the plurality of fingers.

9. The mobile communication device of claim 8, wherein the first number of sets of symbols is equal to the second number of corresponding sets of symbols.

10. The mobile communication device of claim 8, wherein the buffer is further adapted to only write symbols, associated with spreading codes needed by the covariance core, to the plurality of memory banks.

11. The mobile communication device of claim 8, wherein each memory bank of the plurality of memory banks comprises one partition.

12. The mobile communication device of claim 8, wherein a memory bank, of the plurality of memory banks, is adapted to be placed in a low power state when the spreading codes associated with all the partition(s) of the memory bank are determined as not needed by the covariance core.

13. The mobile communications device of claim 8, wherein the buffer is further adapted to reorder symbols such that symbols associated with spreading codes determined to be needed by the covariance core are organized to be written to partitions in a set of memory banks comprising a number of memory banks that is less than the plurality of memory banks.

14. A method of processing symbols through an intermediate symbol buffer; wherein the symbols are provided in sets of symbols; wherein each symbol in a set of symbols is associated with a different one of a plurality of spreading codes; and wherein each set of symbols is from one of a plurality of rake-fingers and one of a plurality of carriers; the method comprising:

a. receiving sequentially by a selector sets of symbols;

b. sequentially buffering, by a buffer, a predetermined number of sets of symbols received from the selector, such that the predetermined number of sets of symbols each comprise a first number of sets of symbols associated with a first carrier from one finger and a second number of sets of symbols associated with a second carrier from the one finger;

c. writing the predetermined number of sets of symbols, from the buffer, to a number of memory partitions logically organized in a plurality of memory banks such that symbols associated with a same spreading code of the plurality of spreading codes are written into a memory partition, of the number of memory portions, associated with the same spreading code.

15. The method of claim 14, wherein the plurality of memory banks are equal in number to the plurality of spreading codes and wherein each of the memory banks comprises one memory partition.

16. The method of claim 14, further comprising setting a memory bank, of the plurality of memory banks, to a low power state when all the memory partition(s) in the memory bank are associated with the same spreading codes of the plurality of spreading codes that have been determined to not be included in a subsequent covariance calculation.

* * * * *

UNITED STATES PATENT AND TRADEMARK OFFICE
CERTIFICATE OF CORRECTION

PATENT NO. : 8,811,453 B2
APPLICATION NO. : 13/239586
DATED : August 19, 2014
INVENTOR(S) : Nas et al.

It is certified that error appears in the above-identified patent and that said Letters Patent is hereby corrected as shown below:

On the title page, item 73 under "Assignee", in Column 1, Line 1, delete "Ouates" and insert -- Ouates (CH) --, therefor.

On the title page, item under "Primary Examiner", in Column 2, Line 1, delete "Phoung Phu" and insert -- Phuong Phu --, therefor.

In the specification

In Column 8, Line 34, delete "bank, o" and insert -- bank, of --, therefor.

In Column 12, Line 66, delete "less then" and insert -- less than --, therefor.

In Column 13, Line 35, delete "the bit" and insert -- the 15 bit --, therefor.

In the claims

In Column 15, Line 12, in Claim 1, delete "subseiuent" and insert -- subsequent --, therefor.

Signed and Sealed this
Nineteenth Day of April, 2016

Michelle K. Lee
*Director of the United States Patent and Trademark Office*